Nov. 17, 1959 E. L. YOUNKER 2,913,578

MULTIVIBRATOR CIRCUITS

Filed March 17, 1954 2 Sheets-Sheet 1

INVENTOR
E. L. YOUNKER
BY
ATTORNEY

Nov. 17, 1959 E. L. YOUNKER 2,913,578

MULTIVIBRATOR CIRCUITS

Filed March 17, 1954 2 Sheets-Sheet 2

INVENTOR
E. L. YOUNKER
BY
ATTORNEY

United States Patent Office 2,913,578

Patented Nov. 17, 1959

2,913,578

MULTIVIBRATOR CIRCUITS

Elmer L. Younker, Madison, N.J., assignor to Bell Telephone Laboratories, Incorporated, New York, N.Y., a corporation of New York Application March 17, 1954, Serial No. 416,824

5 Claims. (Cl. 250—27)

Figure 1:
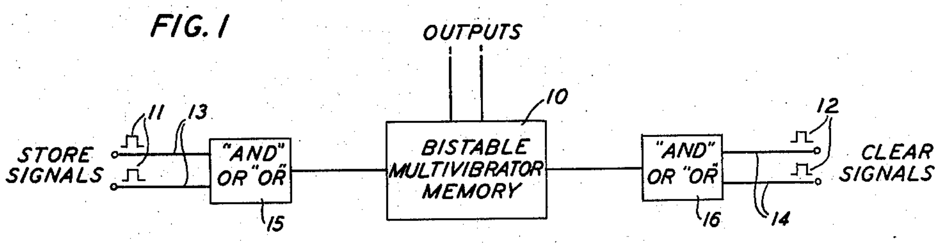

This invention relates to electrical circuits and more particularly to such circuits employing a pair of discharge devices arranged so that conduction can be transferred from one device to the other on the application of a trigger signal to the circuit.

Circuits of this nature are known in the art and variously referred to as bistable multivibrators, monostable multivibrators, flip-flop circuits, trigger circuits, toggle circuits, etc. These circuits are frequently employed as memory or storage elements in electrical computers or other informational systems. The memory may be either self-clearing, as in a monostable circuit, or cleared only on the occurrence of a second event, as in a bistable circuit. In such informational systems, information is often to be stored in the memory or cleared therefrom dependent on a specified logic function, such as the occurrence of signal pulses simultaneously on a pair of leads or the occurrence of a signal pulse on either one of a pair of leads. These are generally referred to as And and Or logic functions and may be either positive or negative dependent on the polarity of the signal pulses to which the memory element is to respond.

In prior circuits the logic functions have been performed by circuits, such as diode circuits, independent of the memory elements, and only the output of the logic circuit has been applied to the control lead of the memory element.

It is an object of the present invention to provide memory circuits having two states in which the logic functions are included in the memory circuits themselves.

It is a further object of this invention to provide improved multivibrator circuits.

It is a still further object of this invention to provide multivibrator circuits capable themselves of responding to any combination of positive or negative And or Or store or clear signals.

It is a more specific object of this invention to provide an improved monostable multivibrator circuit having either one of two time constants.

These and other objects of this invention are attained in specific embodiments in which one stage or discharge element of the multivibrator circuit includes a pair of control electrodes. These control electrodes may be positioned in independent discharge paths or may be the first and third grids of a pentode and be thus positioned in series in a single discharge path. In the prior case, the cathodes and anodes are electrically connected together so that conduction will be present in both paths or in neither. If conduction is present, it can only be transferred to the other element of the multivibrator circuit by the simultaneous application of negative pulses to both control electrodes; however, if conduction is not present it can be transferred from the other element of the multivibrator circuit on the application of a positive pulse to either of the control electrodes. Thus —And and +Or logic functions may be attained.

If the stage of the multivibrator circuit comprises a pentode having a biasing potential applied to its second grid, conduction can be commenced in the tube only by applying positive pulses to both its control electrodes; however if conduction is present in the tube, it can be transferred to the other element of the multivibrator circuit by applying a negative pulse to either control electrode. The logic functions +And and —Or may thus be realized.

Various combinations of these logic functions may be attained by utilizing a pentode as one discharge element of the multivibrator circuit and a pair of triodes, defining the independent discharge paths, as the other discharge element of the multivibrator circuit. The control electrodes of the first element are thus the first and third grids of the pentode and are in series along a single discharge path and the control electrodes of the second discharge element are the control electrodes of the triodes whose anodes and cathodes advantageously are electrically common and are thus in parallel across distinct but interdependent electron discharges.

In one specific embodiment of this invention wherein the memory circuit is a monostable multivibrator circuit, the discharge element defining the unstable state has a pair of control electrodes positioned in series in accordance with this invention and distinct resistance and capacitance circuits, having different time constants, are connected between these control electrodes and the anode of the other discharge element of the multivibrator circuit. A pulser is connected to the control electrode having the RC circuit connected thereto with the longer time constant. Thus the period of the multivibrator circuit will be determined by the time constant of this one RC circuit unless a pulse is applied by the pulser, in which case the period of the multivibrator circuit will be determined by the time constant of the other RC circuit.

It is a feature of this invention that a multivibrator circuit comprises a pair of electron discharge elements, at least one of which has a pair of control electrodes independently connected to the anode of the other discharge element so that the transfer of conduction between the elements can be controlled by the application of signals to one or both of these control electrodes.

More specifically, it is a feature of this invention that the electron discharge element may comprise a pair of distinct electron discharges and the pair of control electrodes comprise grids positioned in these distinct discharges.

More specifically, it is a feature of this invention that the electron discharge element may comprise a multigrid tube and the control electrodes comprise two of the grids of the tube positioned in the path of the discharge between the cathode and anode thereof.

It is a further feature of this invention that any combination of And and Or logic control functions for storage or clearance of the memory may be attained by combinations of these two types of discharge elements.

It is a further feature of one specific illustrative embodiment of this invention that the discharge element of a monostable multivibrator circuit defining the unstable state be a pentode whose first and third grids define control electrodes which are connected to the anode of the discharge element of the other stage of the circuit through two distinct resistance and capacitance circuits having different time constant, a pulser being connected to the control electrode to which is connected the resistance and capacitance circuit having the longer time constant.

Figure 2:
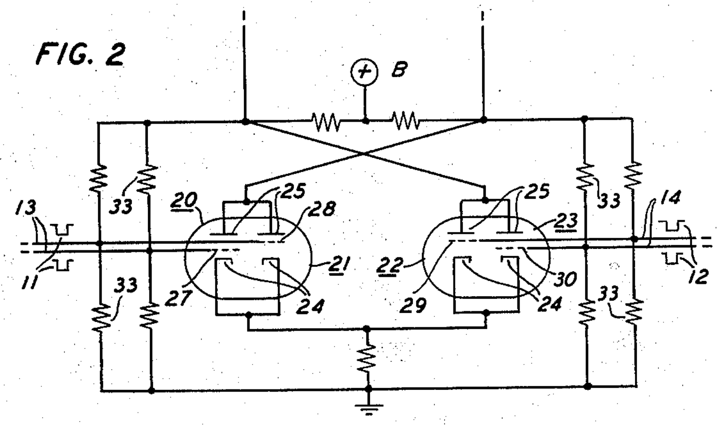
Figure 3:
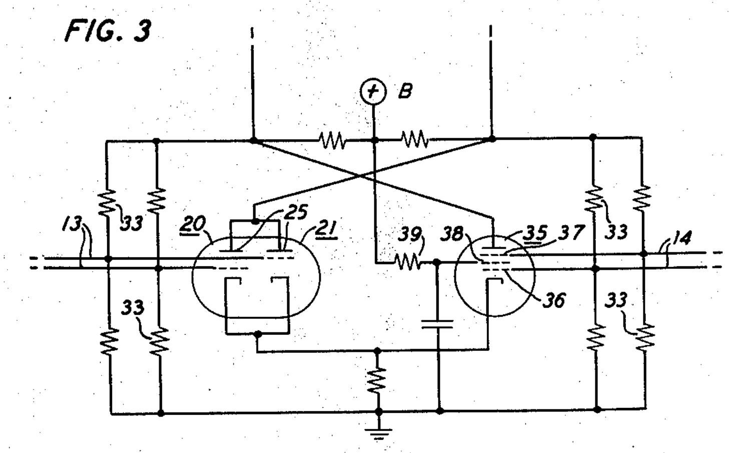
Figure 4:
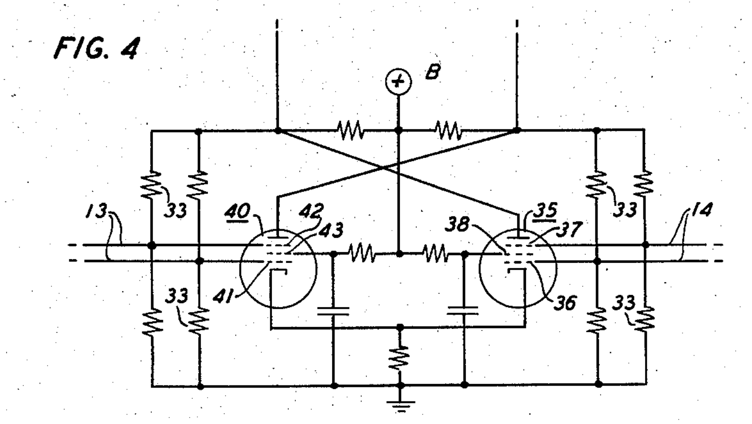
Figure 5:
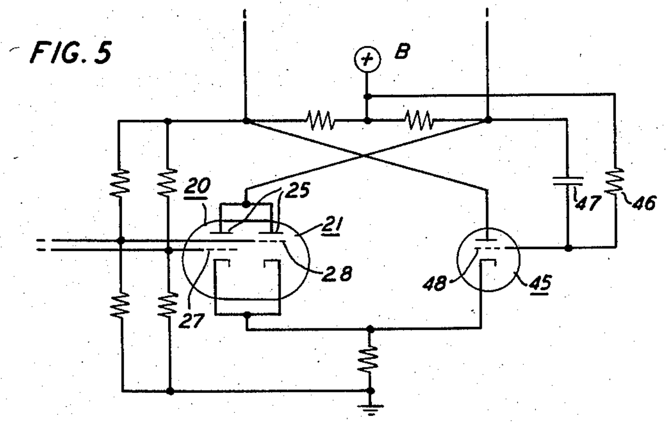
Figure 6:
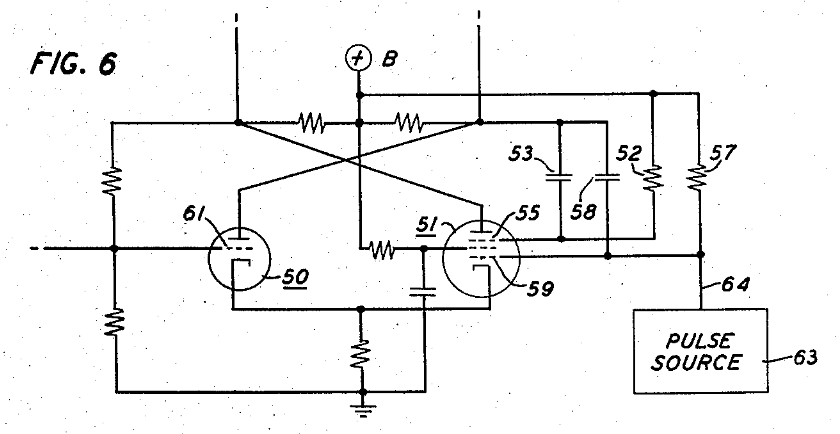

A complete understanding of this invention and of these and various other features thereof may be gained from consideration of the following detailed description and the accompanying drawing, in which:

Fig. 1 is a representation, in block diagram form, of the problem of the prior art;

Figs. 2, 3, and 4 are schematic representations of specific illustrative embodiments of this invention wherein various logic storage and clearance functions may be attained;

Fig. 5 is a schematic representation of another specific illustrative embodiment of this invention wherein the memory circuit is a monostable multivibrator circuit; and Fig. 6 is a schematic representation of another illustrative embodiment of this invention wherein the memory circuit is a monostable multivibrator circuit and in which the memory is self-clearing in a time determined by one of two time constants.

Referring now to the drawings, Fig. 1 depicts the problem of the prior art, which is that it is desirable to control a multivibrator memory circuit 10 by pairs of input store signals 11 and clear signals 12. Priorly, there has been positioned between the signal leads 13 and 14 logic circuits 15 and 16 which may be either And or Or circuits, as desired. In accordance with an aspect of this invention these logic circuits are not required, and the logic function is attained within the memory circuit itself.

Turning now to Fig. 2 there is depicted one specific illustrative embodiment of this invention wherein the logic functions attainable include storage in the memory on application of negative store signals 11 to both store leads 13 and clearing of the memory on application of negative clear signals 12 to both clear leads 14. The circuit comprises a bistable multivibrator circuit in which the electron discharge elements of the two stages of the multivibrator circuit each include a pair of triodes 20, 21, 22 and 23 whose cathodes 24 and anodes 25 are connected together. These triodes may advantageously comprise the two halves of a double triode tube, such as known commercially as the W.E. 396A or the R.C.A. 6J6. The control grids 27, 28, 29 and 30 are connected to separate voltage dividers 33 which make the grid voltages of tubes 22 and 23 dependent on the plate voltage of tubes 20 and 21 and the grid voltages of tubes 20 and 21 dependent on the plate voltages of tubes 22 and 23.

We shall assume the convention in the following discussion that the inactive, or cleared state of the memory is when a discharge exists in the left-hand discharge element, which in this embodiment comprises tubes 20 and 21. Application of positive store signals to leads 13 will have no effect in changing the state of the memory. If a negative store signal is applied to either lead 13 it will extinguish the conduction in one of the triodes 20 and 21, but as conduction will continue in the other triode of the pair during application of the single store signal, a change in the memory will not be effected. However if negative store signals 11 are applied to both input leads 13, conduction will transfer from the triodes 20 and 21 to the triodes 22 and 23 and storage in the memory will be effected. To clear the memory by applying negative clear signals 12 to leads 14 similarly requires the simultaneous application of clear signals to both leads 14.

The specific embodiment of the invention depicted in Fig. 2 therefore includes within the memory circuit negative And circuits for the storage and clearance of the memory.

The embodiment depicted in Fig. 2 can also be employed if positive Or logic for both storage and clearance are desired. In this instance the application of a positive store signal 11 to either lead 14 will cause conduction to transfer and storage to be effected in the memory. Similarly clearance of the memory can be attained by application of a positive clear signal 12 to either lead 13.

It is apparent that storage and clearance of the memory can also be attained by applying input signals to only one pair of leads 13 and 14. By this is meant that both storage and clearance signals may be applied to leads 13 or alternatively both may be applied to leads 14. Thus the embodiment of Fig. 2 may also be employed when the desired logic includes negative And storage and positive Or clearance or positive Or storage and negative And clearance.

In the embodiment of Fig. 3 the second discharge element of the memory circuit, which comprised the pair of triodes 22 and 23 in the embodiment of Fig. 2, is a pentode 35, such as an R.C.A. 6AS6, whose first and third grids 36 and 37, normally referred to as the control and suppressor grids, are connected to the voltage dividers 33 so that their potentials are dependent on the plate potential on tubes 20 and 21. The second, or screen grid, 38 is connected to a positive voltage supply through resistor 39 to bias the grid 38 to enable the tube 35 to conduct after the positive signals applied to the grids 36 and 37 have been removed; the positive signals may be applied either from leads 14 or from the plates 25 of tubes 20 and 21.

In the inactive state conduction exists in tubes 20 and 21. Conduction may be transferred by the application of the same control signals to leads 13 as in the embodiment of Fig. 2. However now conduction may also be transferred by applying positive storage pulses to both leads 14, to store in the memory, or by applying a negative signal to either lead 14 to clear the memory.

In the embodiment of Fig. 4 both discharge elements of the memory circuit comprise pentodes, the right-hand element being the pentode 35 of the prior embodiment and the left-hand element being the pentode 40 having its first and third grids 41 and 42 connected to the voltage dividers 33 and to the control leads 13 and the second grid 43 to the positive voltage supply.

The various logic controls that can be attained by these three specific embodiments of the invention are summarized in the following table in which the positive or negative sign indicates the polarity of the applied pulse to effect transfer of conduction in the memory, the logic symbols Or and And indicate whether the application of control signals to one or both control leads is required, and the convention is followed, as above, that storage is effected in the memory when conduction is present in the right-hand discharge element of the memory circuit:

| | leads 13 | leads 14 |
|---|---|---|
| Fig. 2: | | |
| store | −And | +Or |
| clear | +Or | −And |
| Fig. 3: | | |
| store | −And | +And |
| clear | +Or | −Or |
| Fig. 4: | | |
| store | −Or | +And |
| clear | +And | −Or |

From the above table it is apparent that any desired combination of logic functions can be attained in multivibrator circuits in accordance with this invention. In the table either store logic function can be combined or utilized with either clear logic function in any embodiment. Additionally, it is apparent that to attain the combination of −Or store and −And clear the inverse of Fig. 3 may be employed, i.e., an embodiment in which storage in the memory is effected when there is conduction in a pair of triodes and no conduction in a pentode.

While this invention has been disclosed above with reference to bistable memory circuits in which both store and clear logic functions are desired, it is to be understood that it is equally applicable to monostable memory circuits utilizing a self-clearing memory in which only storage is to be effected in accordance with a logic function. Such a circuit is shown in Fig. 5 wherein the normally conducting element of the circuit comprises the pair of triodes 20 and 21 as priorly described with reference to Figs. 2 and 3. The normally non-conducting element of the memory circuit may be a single triode 45 having a parallel resistance 46 and capacitance 47 connected between its control grid 48 and the anodes 25 of the tubes 20 and 21. The length of the storage period is determined by the time constant of the resistance and capacitance circuit.

Storage is effected in the memory by shifting the conduction from the triodes 20 and 21 to the normally cut off triode 45; a negative signal on both control grids 27 and 28 will transfer the conduction and thus effect storage in the memory. The embodiment of Fig. 5 is thus a monostable memory circuit having an inherent —And storage logic. If the triode 45 is normally conducting and storage effected on transfer of the conduction to the normally cut off triodes 20 and 21, a +Or storage logic is attained.

In the embodiment of Fig. 6, a monostable memory circuit is depicted in which the one discharge element of the circuit is a triode 50 and the normally conducting discharge element is a pentode 51; in this embodiment storage is effected when the left-hand discharge element conducts. In some instances it is desirable to store information in a memory circuit for a certain period unless some independent occurrence happens, in which case it is desirable to clear the memory at an earlier time. In the embodiment of Fig. 6 a resistance 52 and capacitance 53 defining a first RC timing circuit are connected to the third, or suppressor, grid 55 of the pentode 51 and a resistance 57 and capacitance 58, defining a second RC timing circuit, are connected to the first, or control, grid 59 of the pentode 51. The resistance and capacitance values are so chosen that $R_{52}C_{53}<R_{57}C_{58}$. In the normal state, in which no information is stored in the memory circuit, tube 51 is conducting. Storage is effected by application of a positive control pulse to the control grid 61 of the triode 50 to cause conduction to shift to that triode. Because of the relative values of the capacitances and resistances connected to the first and third grids 55 and 59 of the pentode 51, the third grid 55 will reach a potential which allows return of the conduction to pentode 51, and thus clearance of the memory, before the control grid reaches such a potential. However since both of these two grids must be sufficiently positive to permit reversal of conduction in the memory circuit, the storage period of the memory circuit is determined solely by $R_{57}C_{58}$.

However if, in the associated circuitry, an event has happened on the occurrence of which it is desired to clear the memory circuit before the time determined by the first grid time constant, a positive pulse is applied by a pulse source 63 to the lead 64 connected to the first grid 59. Then as soon as the potential of the third grid 55 returns sufficiently positive, as determined by the time constant of the $R_{52}C_{53}$ circuit, conduction is transferred and the memory cleared.

Thus by applying a positive signal from the pulse source 63 to the grid 59 before either grid 55 or 59 has attained a sufficiently positive potential to cause conduction to be transferred to tube 51, the storage period can be changed from one determined by $R_{57}C_{58}$ to one determined by $R_{52}C_{53}$ and the external signal in effect controls the time at which the memory is cleared. If the positive signal is applied from source 63 in the interval after a sufficient positive potential has been attained by grid 55 but before that potential has been attained by grid 59, the memory will be cleared by the application of this positive pulse.

It is apparent that the normally cut-off discharge element of the circuit of Fig. 6 could be a pentode or double triode, as described above, so that storage could be effected on the occurrence of +And or +Or logic conditions.

It is to be understood that the above described arrangements are merely illustrative of the application of the principles of the invention. Numerous other arrangements may be devised by those skilled in the art without departing from the spirit and scope of the invention.

What is claimed is:

1. In combination, a first electron discharge means for producing a pair of distinct electron discharges including cathode means and anode means electrically common to said two discharges and control electrode means individual thereto, second electron discharge means including cathode means, anode means, and control electrode means, said control electrode means of said first discharge means being individually connected to said anode means of said second discharge means and said control electrode means of said second discharge means being connected to said anode means of said first discharge means so as to comprise a multivibrator circuit having two states corresponding to discharges existing in said two discharge means, and means for applying control pulses to each of said control electrode means of said first discharge means to change the state of said multivibrator circuit.

2. In the combination of claim 1, means including a timing resistance and capacitance circuit connecting said control electrode means of said second discharge means to said anode means of said first discharge means so as to render said multivibrator circuit monostable.

3. In the combination of claim 1, said second electron discharge means having said cathode means and anode means arranged to produce two distinct discharges, and said control electrode means of said second electron discharge means comprising at least a pair of electrodes individual to said two discharges.

4. In combination in a multivibrator circuit, first electron discharge means for providing a pair of distinct electron discharges including cathode means and anode means electrically common to said two discharges and control electrode means individual thereto, second electron discharge means comprising a cathode, anode, and a pair of control electrode means positioned between said anode and said cathode, said pairs of control electrode means and said anode means and said anode being individually electrically connected together so as to comprise a multivibrator circuit having two states corresponding to electron discharges existing in said first and second discharge means, and means for applying control pulses to said control electrode means to change the state of said multivibrator circuit.

5. In combination, a pair of electron discharge means each having anode means, cathode means, and control electrode means, at least one of said discharge means having a pair of control electrode means each individually connected to said anode means of the other of said discharge means, and said control electrode means of said other discharge means connected to said anode means of said one discharge means so as to comprise a multivibrator circuit having two states corresponding to discharges existing in said two discharge means, and means for selectively applying distinct control signals to each of said pair of control electrode means of said one discharge means to change the state of said multivibrator circuit, said one discharge means providing a pair of distinct electron discharges and one of said pair of control electrode means being positioned in each of said electron discharges.

References Cited in the file of this patent

UNITED STATES PATENTS

| | | |
|---|---|---|
| 2,480,338 | Purington | Aug. 30, 1949 |
| 2,540,025 | Bergfors | Jan. 30, 1951 |
| 2,540,551 | Shenk et al. | Feb. 6, 1951 |
| 2,645,713 | Pritchard | July 14, 1953 |
| 2,695,962 | Nibbe | Nov. 30, 1954 |